(12) United States Patent
Beaman et al.

(10) Patent No.: US 6,938,500 B2
(45) Date of Patent: Sep. 6, 2005

(54) SPINDLE TEST APPARATUS AND METHOD

(75) Inventors: Danny L. Beaman, Kent, WA (US);
George V. Neilson, Powell, WY (US);
Mark M. Walker, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 7 days.

(21) Appl. No.: 10/462,871

(22) Filed: Jun. 17, 2003

(65) Prior Publication Data

US 2004/0255698 A1 Dec. 23, 2004

(51) Int. Cl.$^7$ ................................................ G01L 5/12
(52) U.S. Cl. ..................... 73/862.49; 73/862; 73/331
(58) Field of Search ..................... 73/862.49, 862.331, 73/862.333

(56) References Cited

U.S. PATENT DOCUMENTS

| | | | |
|---|---|---|---|
| 2,316,253 A | | 4/1943 | Keinath |
| 3,605,488 A | | 9/1971 | Foster |
| 4,419,901 A | | 12/1983 | Ruppert et al. |
| 4,629,262 A | * | 12/1986 | Hamilton .................. 310/90.5 |
| 5,533,403 A | * | 7/1996 | Haeg et al. .................. 73/669 |
| 5,609,342 A | | 3/1997 | Peterson et al. |
| 6,496,789 B2 | * | 12/2002 | Seth et al. .................... 73/824 |
| 6,568,854 B2 | | 5/2003 | Schleinitz |
| 6,766,684 B2 | * | 7/2004 | Bertz et al. ................. 73/118.1 |

FOREIGN PATENT DOCUMENTS

| | | |
|---|---|---|
| DE | 38 18 661 A | 12/1988 |
| RU | 2104824 | 2/1998 |
| SU | 746236 | 7/1980 |
| SU | 1796347 | 2/1993 |

OTHER PUBLICATIONS

PCT International Search Report filed on Form PCT/ISA/210, International Application No. PCT/US2004/019667, International Filing Date Jun. 16, 2004, File Reference 03–0148, Applicant—The Boeing Company.

* cited by examiner

*Primary Examiner*—Max Noori
(74) *Attorney, Agent, or Firm*—Alston & Bird LLP

(57) ABSTRACT

An apparatus and method for testing a spindle are provided. The apparatus includes a rotational load device and a linear load device. The rotational load device is connected to the spindle via a shaft and configured to rotationally load the spindle. The linear load device is configured to apply a predetermined linear load on the shaft, so that the linear load is at least partially transmitted to the spindle. The spindle can be subjected to various linear and rotational loads to determine the effectiveness of the spindle, and the performance of the spindle can be measured.

31 Claims, 3 Drawing Sheets

SPINDLE TEST APPARATUS AND METHOD

BACKGROUND OF THE INVENTION

1) Field of the Invention

The present invention relates to rotational spindles and, more particularly, to an apparatus and method for testing spindles.

2) Description of Related Art

Spindles are used in a wide variety of machines to provide a mechanism for generating and/or transferring rotational motion. One typical spindle includes an electric motor coupled to a shaft. The motor and shaft are mounted in a housing and at least one end of the shaft extends from the housing to connect to a tool. Bearings, bushings, and spacers can be used to maintain the position of the shaft in the housing. The motor is used to rotate the shaft and, hence, the tool. For example, a tool such as a machining bit can be connected to the shaft, and the spindle can be used in a high speed machining device such as a computer numerical control (CNC) machine device for machining structural materials. Alternatively, a spindle can be used in conjunction with an external rotational device, such as a motor, and with no motor provided within the housing. Thus, the spindle can comprise a shaft that is mounted in a housing, for example, with bearings or bushings to support the shaft so that the shaft is freely rotatable.

Each device and process that uses a spindle requires the spindle to have particular characteristics such as size, strength, maximum torque, fatigue resistance, and the like. If a spindle is not properly matched with the device and process for which it is used, the spindle can wear excessively and fail prematurely. For example, the spindle described above for use in a high speed machining device can fail if the spindle motor overheats, the shaft breaks, bearings or bushings wear or heat excessively, and so forth. Failure of a spindle can require repair or replacement, adding to the cost of the operation of the device. Additionally, a failed spindle can interrupt the operation of the device, thereby incurring costs associated with machine downtime such as delays in production, loss in productivity, and wasted materials.

Past attempts have been made to evaluate the effectiveness of a spindle before the spindle is used in a particular application. For example, if a spindle is to be used in a CNC machine device for machining aluminum parts, the spindle can be subjected to a test to determine the effectiveness of the spindle in such an application. In particular, the spindle can be installed in a test device that is similar to the machine in which the spindle is to be used, so that the test device applies stress to the spindle similar to that which would occur during operation. The test device can be operated continuously until the spindle fails. Thus, the test can be used to determine an expected longevity of the spindle in the application, and the temperature and vibration characteristics of the spindle can also be measured during the test period. However, such a test requires time and personnel for conducting the test. Further, the aluminum or other material that is machined or otherwise consumed during testing can be costly.

Alternatively, the test device can include a dynamometer that is mechanically coupled to the spindle. The dynamometer can be used to exert a particular rotational resistance on the spindle over a test period to determine the power and torque output of the spindle during the test period. Testing with a dynamometer can save the expense of wasted material that is consumed, but the dynamometer adds to the cost of the test device. Moreover, the dynamometer does not measure or test other factors that influence the effectiveness of the spindle. For example, a spindle can be subject to side or axial loads during typical operation that are not applied during testing. Such loading can substantially decrease the operating life and effectiveness of the spindle. Additionally, in typical operation, the spindle may be subjected to vibrations or other cyclical forces, for example, in phase with the impact of teeth or blades of the tool on the workpiece. These vibrations or other cyclical forces, which are not applied or measured by the dynamometer during testing, can substantially affect the operation and life of the spindle, thereby reducing the accuracy of the test.

Thus, there exists a need for an improved apparatus and method for testing spindles. The apparatus should be capable of testing various types of spindles by subjecting each spindle to particular torques, axial loads, side loads, and cyclical forces, continuously or according to a predetermined schedule. The apparatus should also be compatible with monitoring equipment to determine the effectiveness of the apparatus under predetermined conditions.

BRIEF SUMMARY OF THE INVENTION

The present invention provides an improved apparatus and method for testing a spindle. The apparatus includes a rotational load device that is connected to the spindle via a shaft so that the rotational load device is configured to rotationally load the spindle, i.e., by rotating or resisting rotation of the spindle. Further, a linear load device is configured to apply a predetermined load on the shaft so that the linear load is at least partially transmitted to the spindle.

According to one embodiment of the present invention, the linear load device is a magnetic bearing that includes a rotor and a stator. The rotor is configured to rotate with the spindle, and the stator extends circumferentially at least partially around the rotor. The rotor and stator are configured to generate an electromagnetic force therebetween so that the spindle is urged in the predetermined direction. The linear load can be applied on the shaft axially, transversely, or at some angle between the axial and transverse directions. Further, a controller can be configured to selectively adjust the magnitude and/or the direction of the linear load. For example, the controller can apply the linear load cyclically on the spindle. The rotational load device can be a rotational actuator that is configured to rotate the shaft and the spindle, or a generator configured to transduce rotational motion into electrical energy. A decoupling device can be provided to at least partially decouple the rotational load device from the spindle so that the linear load is transmitted primarily to the spindle. The shaft can also include a releasable connector configured to releasably connect the spindle thereto. One or more devices can be configured to detect operational parameters of the apparatus.

The present invention also includes a method of testing a spindle for use with a tool. The method includes rotatably connecting the spindle to a rotational load device via a shaft, and rotating the spindle and the rotational load device. For example, the spindle can be energized to rotate the shaft and the rotational load device so that the rotational load device provides a rotational resistance on the spindle. Alternatively, the rotational load device can be energized to thereby rotate the shaft and spindle. The linear load device, such as a magnetic bearing, is energized to apply a predetermined linear load on the spindle in a predetermined direction, such as axially and/or transversely to the shaft. A controller can selectively adjust the linear load, for example, cyclically at a frequency that corresponds to a rotational pass frequency of one or more features on the tool occurring at a typical or predetermined rotational operating speed of the spindle. One or more operational parameters of the apparatus can be detected.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
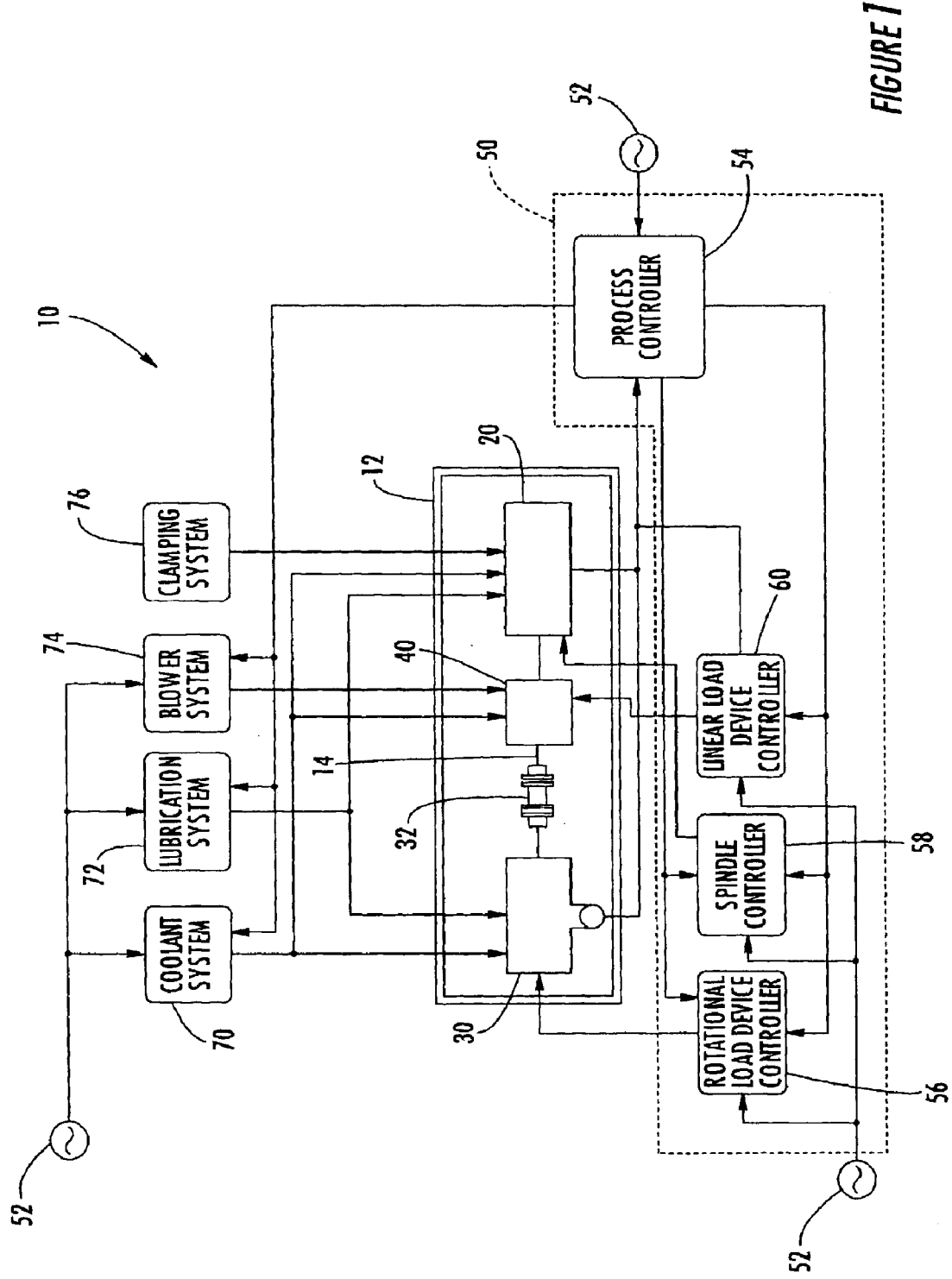
FIG. 1 is a schematic view illustrating an apparatus for testing a spindle according to one embodiment of the present invention.

Referring now to the figures and, in particular, FIG. 1, there is schematically illustrated an apparatus 10 for testing a spindle 20 according to one embodiment of the present invention. As shown, the spindle 20 can be mounted on a frame or base 12 and connected to a rotational load device 30 via a shaft 14. The shaft 14 extends through a linear load device 40, such as a magnetic bearing. The rotational load device 30 is configured to apply a rotational load on the spindle 20, and the linear load device 40 is configured to apply a linear load on the spindle 20. A control system 50 communicates with the spindle 20, the rotational load device 30, and the linear load device 40.

Figure 3:
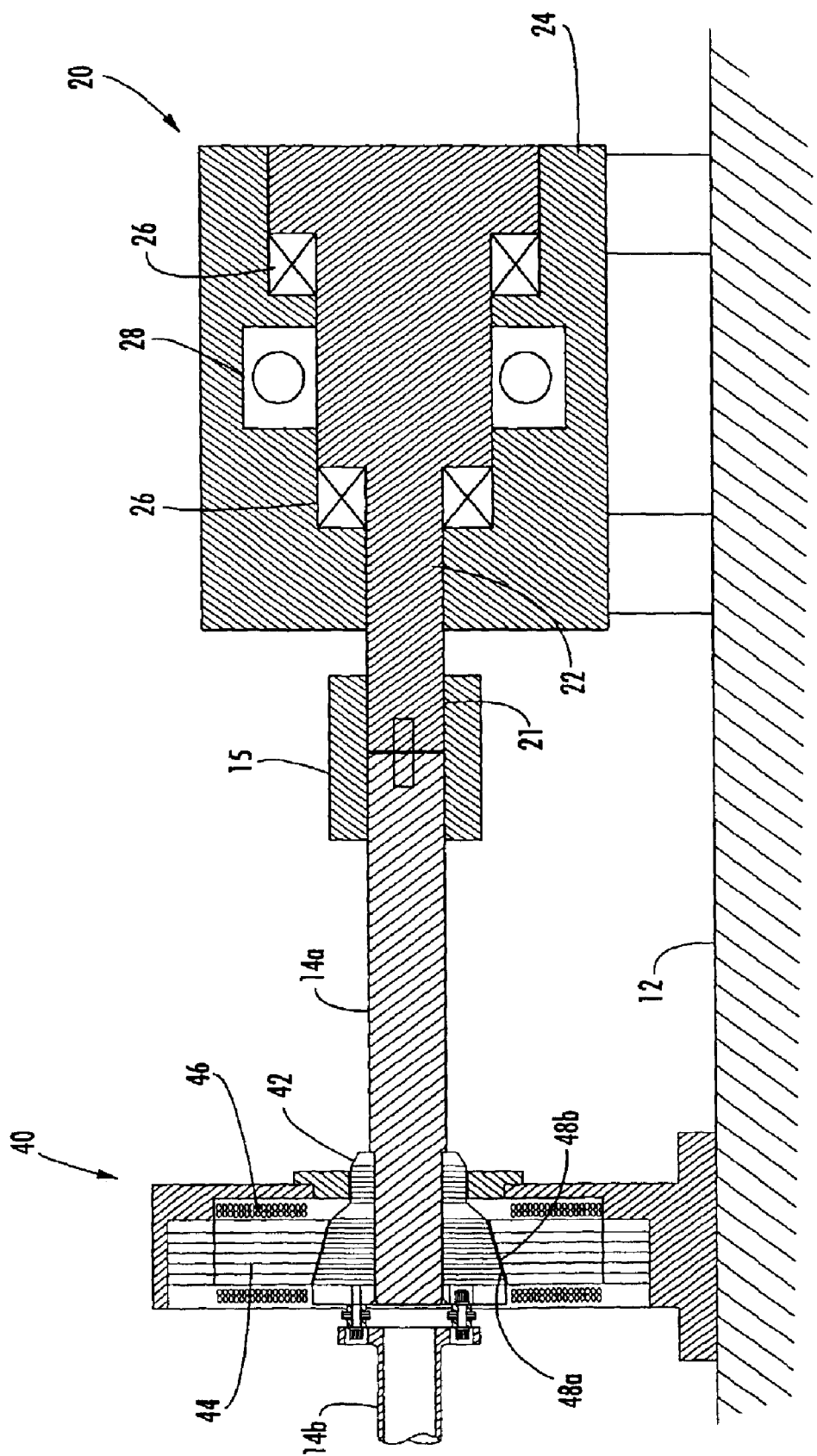
FIG. 3 is a partial section view in elevation of the linear load device and spindle of the apparatus of FIG. 1.

A variety of different spindles 20 can be tested according to the present invention. For example, as shown in FIG. 3, the spindle 20 can include a shaft 22 extending in an axial direction at least partially through a housing 24. The shaft 22 is supported by a number of bearings 26, and an actuator 28 mounted within the housing 24 is configured to rotate the shaft 22 in one or both directions. One end of the shaft extends from the housing 24 and defines a connection portion 21 that is configured to connect to a drive shaft, a machine tool, or other rotational device (not shown) during operation. The spindle 20 can be connected to a power supply to energize the actuator 28, and the rotating tool can be used for drilling, cutting, controlling other devices, or other rotational functions. The spindle 20 can also be configured to extend, retract, reciprocate, or otherwise move the shaft 22. Alternatively, in other embodiments, the spindle is a rotational transmission device that supports a shaft but does not include a rotational actuator for rotating the shaft, i.e., the spindle is configured to transmit rotational motion between components such as an actuator and a tool.

Figure 2:
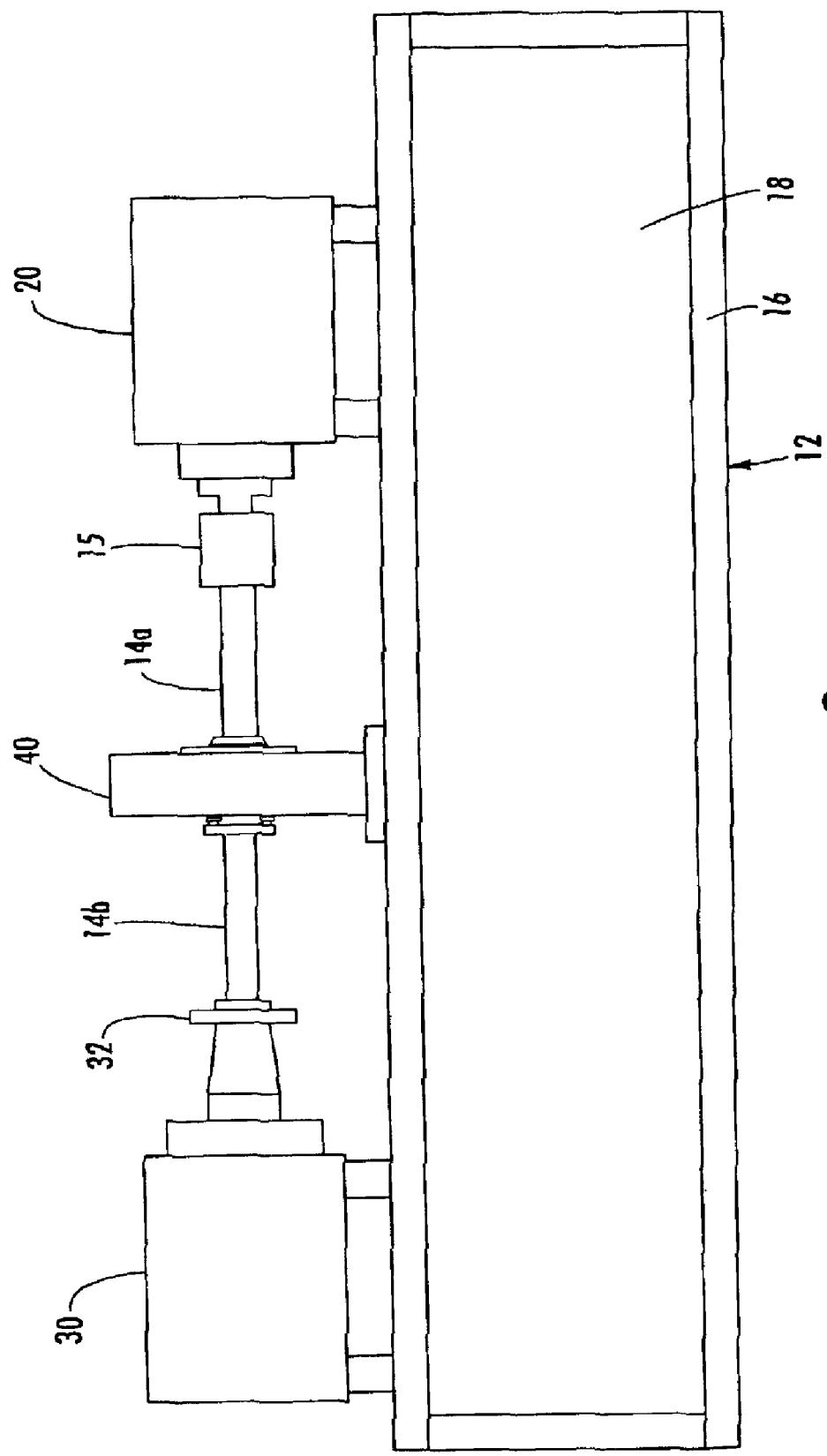
FIG. 2 is an elevation view illustrating the apparatus of FIG. 1.

During testing, the spindle 20 is mounted on the base 12 with the load devices 30, 40, as shown in FIG. 2, though other arrangements can similarly be provided for support.

The base 12 is formed of a damping material to minimize the transmission of vibrations from the apparatus 10. For example, the base 12 can be formed of a steel structure 16, which is filled or surrounded by a polymer concrete 18. The spindle 20 and load devices 30, 40 are bolted or otherwise connected to the base 12, and the spindle 20 can be removably connected to the base 12 so that the spindle 20 can be connected, tested, then removed and replaced with another spindle for subsequent testing. The spindle 20 and the load devices 30, 40 can also be mounted to be adjustable in a direction parallel and/or perpendicular to the axial direction of the shaft 14, for example, to accommodate spindles 20 of different sizes and shapes and to adjust the loading conditions on each spindle 20.

The connection portion 21 of the spindle 20 is removably connected to the shaft 14, which connects the spindle 20 to the rotational load device 30. The shaft 14 can be a single structure that extends between the spindle 20 and rotational load device 30, or the shaft 14 can be formed of multiple connected portions that are generally coaxial. For example, as shown in FIG. 2, a first shaft member 14a extends between the spindle 20 and the linear load device 40, and a second shaft member 14b extends between the linear load device 40 and the rotational load device 30. The connections between the shaft members 14a, 14b, between the second shaft member 14b and the rotational load device 30, and between the first shaft member 14a and the spindle 20 can be keyed connections, threaded connections, press fit connections, bolted couplings, and the like. For example, a releasable connector 15 can be provided on the shaft member 14a for receiving a typical connection portion 21 of a spindle 20. The connector 15 can also be adjustable for accommodating spindles 20 of different sizes.

Further, the shaft 14 can be partially decoupled from the rotational load device 30 by a flexible coupling 32. The flexible coupling 32 can comprise a flexible metallic diaphragm, as is known in the art, which can provide, for example, about 0.080 inch of axial movement so that the rotational load device 30 is thereby partially axially decoupled from the linear load device 40. The flexible coupling 32 can also partially decouple the rotational load device 30 from transverse motion and/or vibratory or otherwise cyclic motion of the shaft 14. Such decoupling isolates the rotational load device 30 from axial and transverse loads applied by the linear load device 40 so that those loads are instead transmitted to the spindle 20.

The linear load device 40 is configured to generate an electromagnetic force for applying the linear load on the spindle 20 in a predetermined direction via the first shaft member 14a. For example, as shown in FIG. 3, the linear load device 30 can be a magnetic bearing, as is known in the art. The magnetic bearing includes a rotor 42, which is connected to the first shaft member 14a and configured to rotate therewith, and a stator 44 that extends circumferentially around the rotor 42 and is configured to remain stationary as the shaft 14 rotates. Electrically conductive coils or windings 46 on the stator 44 are energized to generate an electromagnetic field that attracts or repels the rotor 42. Thus, the linear load can be applied to the shaft 14 and, hence, the spindle 20, without mechanical contact between the rotor 42 and stator 44. The linear load can be applied in the axial direction and directed toward or away from the spindle 20. Alternatively, the linear load can be applied in a transverse direction, i.e., a radial direction perpendicular to the axial direction of the shaft 14. Further, the linear load device 30 can be configured to apply the linear load in a direction oblique to the axial direction of the shaft 14, i.e., so that both axial and transverse loads are applied to the spindle 20. For example, the rotor 42 and stator 44 can define opposing frustoconical surfaces 48a, 48b between which the electromagnetic force is applied so that the rotor 42 is urged both axially and transversely. The angle of the frustoconical surfaces 48a, 48b can be configured to achieve a particular direction for the linear load, for example, to correspond to the direction of the load typically encountered by a spindle in a particular operation. The linear load applied by the device 40 can be determined by measuring the electrical current flowing through the windings 46 or by measuring the displacement of the shaft 14 from the center of the stator 44, for example, using two electronic position sensors (not shown).

The rotational load device 30 is configured to rotationally load the spindle 20, i.e., apply a rotational load, or torque, to the shaft 14 and, hence, the spindle 20. By the term "rotational loading," it is meant that the rotational load device 30 can apply a positive torque that tends to rotate the spindle 20, and/or the rotational load device 30 can apply a resistive torque that tends to resist the rotational motion of the spindle 20. Thus, one of the spindle 20 or the rotational load device 30 can rotate the shaft 14 while the other device 20, 30 resists the rotation. The rotational load device 30 can be a rotational actuator, such as an electrical, hydraulic, or pneumatic motor that rotates the shaft 14 and the spindle 20. A rotationally actuated load device 30 can be used, for example, to rotate a spindle that does not include a rotational actuator. Alternatively, the rotational load device 30 can be a mechanically frictionally resistive device or a hydraulically or pneumatically resistive device. Such a resistive rotational load device 30 can be used to simulate the resistive load applied to the spindle 20 during typical operation, for example, the rotationally resistive load applied to a tool and spindle 20 during a machining operation. The rotational load device 30 illustrated in FIG. 2 is an electrical dynamometer that functions as an electrical generator configured to transduce rotational motion into electrical energy. The electrical energy generated thereby can be used to power the spindle 20 or other components of the apparatus 10, thereby reducing the net electrical power required for operation of the apparatus 10 and increasing the overall efficiency of the apparatus 10. Further, the dynamometer or other rotational load device 30 can also generate data regarding the speed, torque, vibration, and other conditions of the load device 30.

The control system 50 shown in FIG. 1 is configured to control the spindle 20, linear load device 40, and rotational load device 30. The control system 50 can include one or more logical processors and memory devices, and the control system 50 can be a single device that controls all of the components of the apparatus 10, or multiple independent controllers can be used. One or more electrical power sources 52 are provided for the control system, and the power sources 52 can derive energy from the rotational load device 30 as described above. As illustrated in FIG. 1, the control system 50 includes a process controller 54 that controls a rotational load device controller 56, a spindle controller 58, and a linear load device controller 60, each of which drives its respective device 30, 20, 40. For example, the process controller 54 can receive test parameters, which are automatically measured by the apparatus 10 or input by an operator using an input interface, including information describing the type of spindle 20 to be tested and test conditions such as the speed or torque of the spindle 20 and/or rotational load device 30, the direction, point of application, and magnitude of the linear load applied by the linear load device 40, the duration of the test, and the like. Each of the controllers 54, 56, 58, 60 can also receive signals from one or more of the devices 20, 30, 40 and the other control devices 54, 56, 58, 60 indicative of one or more of the operational parameters of the devices.

The control system 50 can also communicate with other components of the apparatus 10 in order to receive test data from the components and control the other components. For example, as shown in FIG. 1, a coolant system 70 can be configured to deliver a coolant fluid to the rotational load device 30, the linear load device 40, and the spindle 20 to control the temperature of those devices. Similarly, lubrication and blower systems 72, 74 can provide lubricant or air to the devices 20, 30, 40 to control wear, heating, and the accumulation of debris in and around the devices. In addition, a clamping system 76 can be provided for releasably connecting the spindle 20 to the base 12. The clamping system 76 can include hydraulic or mechanical clamping mechanisms, for example. The systems 70, 72, 74, 76 are electrically connected to a power source 52, which can be the same as or different from the power sources 52 provided for the control system 50. Heat, speed, and vibration sensors (not shown) can be configured to monitor the temperature, speed, and vibratory motion of the spindle 20, linear load device 40, and/or rotational load device 30. The heat, speed, and vibration sensors can communicate with the control system 50.

During testing, the rotational and linear loads can be applied to simulate the forces that are applied on the spindle 20 during typical operation, i.e., when the spindle 20 is used for a particular application, such as machining. The forces can be determined theoretically or based on empirical data derived from measurements taken during operation of the spindle 20. For example, the rotational and linear load devices 30, 40 can be configured to apply rotational and linear loads that are characteristic in magnitude of a load applied to the spindle 20 during a typical machining, cutting, drilling, or other operation. Further, the direction and point of application of the linear load on the shaft 14 can be determined according to the dimensions of the spindle 20 and the equipment with which the spindle 20 is to be used. For example, if the spindle 20 is to be used to rotate a cutting wheel for cutting material, the linear load can be applied transversely at a point coinciding with the mount position of the cutting wheel. Alternatively, if the spindle 20 is to be used to rotate a drilling tool that is urged axially into material to form holes, the linear load can be applied axially to simulate the force transmitted though the drilling tool during such a plunging operation. Similarly, both axial and transverse linear loads can be applied to provide an oblique load on the spindle 20.

The rotational and linear loads also can be varied during the test cycle, i.e., the direction and/or magnitude of the rotational and linear loads can be adjusted to simulate the likely operating conditions to which the spindle 20 will be subjected. In the case of a spindle 20 that is to be used to drive a tool with one or more features such as teeth, the spindle can be subjected to a cyclical rotational and/or linear load that simulates the rotational and linear forces associated with the use of such a tool. For example, if the spindle 20 is to be used to rotate a cutting or machining tool with multiple teeth, the rotational and/or linear loads can be cycled at the tooth pass frequency, i.e., a frequency equal to the number of teeth around the circumference of the tool multiplied by the rotational speed of the tool. Thus, the test can simulate the cyclical loading of the spindle 20 due to the impact of the individual teeth or other features on the tool.

Data collected by the control system 50 can be used as feedback for control of the apparatus 10, and the data also can be logged and compiled in a report that describes the results of test. For example, the process controller 54 is configured to receive data from the rotational and linear load devices 30, 40, the spindle 20, the coolant system 70, the lubrication system 72, the blower system 74, the clamping system 76, and the heat, speed, and vibration sensors. The process controller 54 can output the data via a user interface, and the information can be used to assess the performance of the spindle 20 and the apparatus 10. The process controller 54 can also continually monitor the apparatus 10 and stop the test or alert an operator if certain conditions are met, for example, if the spindle 20 or another component breaks, overheats, or otherwise fails.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for testing a spindle, the apparatus comprising:
    a rotational load device;
    a shaft extending in an axial direction and rotatably connecting the rotational load device and the spindle such that the rotational load device is thereby configured to rotationally load the spindle; and
    a linear load device configured to apply a predetermined linear load on the shaft in a predetermined direction, thereby linearly loading the spindle,
    wherein the linear load device is a magnetic bearing having a rotor and a stator, the rotor configured to rotate with the spindle, the stator extending circumferentially at least partially around the rotor, and the rotor and stator configured to generate an electromagnetic force therebetween that urges the spindle in the predetermined direction.

2. An apparatus according to claim 1 further comprising a releasable connector configured to releasably connect the spindle to the shaft.

3. An apparatus according to claim 1 wherein the linear load device is configured to apply the linear load in a transverse direction perpendicular to the axial direction of the shaft.

4. An apparatus according to claim 1 wherein the linear load device is configured to apply the linear load in a direction oblique to the axial direction of the shaft, thereby urging the spindle at least partially in the axial direction.

5. An apparatus according to claim 1 further comprising a controller configured to selectively adjust at least one of a magnitude of the linear load and the direction of the linear load.

6. An apparatus according to claim 1 wherein the controller is configured to adjust at least one of the rotational load and the linear load cyclically.

7. An apparatus according to claim 1 further comprising a device configured to detect at least one operational parameter of the apparatus.

8. An apparatus according to claim 1 wherein the shaft comprises a decoupling device that at least partially decouples the rotational load device from the spindle such that the linear load is transmitted primarily to the spindle.

9. An apparatus according to claim 1 wherein the rotational load device is a rotational actuator configured to rotate the shaft and the spindle.

10. An apparatus according to claim 1 wherein the rotational load device is configured to transduce rotational motion into electrical energy.

11. An apparatus for testing a spindle, the apparatus comprising:
    a rotatable spindle extending in an axial direction;
    a frame configured to support the spindle;
    a rotational load device connected to the frame;
    a shaft in rotatable communication with the rotational load device and the spindle such that the rotational load device is thereby configured to rotationally load the spindle; and
    a magnetic bearing configured to apply a predetermined linear load on the spindle in a predetermined direction, the magnetic bearing having a rotor and a stator, the rotor configured to rotate with the spindle, the stator in communication with the rotor, and the rotor and stator configured to generate an electromagnetic force therebetween that urges the spindle in the predetermined direction.

12. An apparatus according to claim 11 further comprising a releasable connector configured to releasably connect the spindle to the shaft.

13. An apparatus according to claim 11 wherein the spindle comprises a housing, a spindle shaft rotatably mounted at least partially in the housing, and a rotational actuator configured to rotate the spindle shaft.

14. An apparatus according to claim 11 wherein the stator extends circumferentially at least partially around the rotor.

15. An apparatus according to claim 11 wherein the magnetic bearing is configured to apply the linear load in a transverse direction perpendicular to the axial direction of the shaft.

16. An apparatus according to claim 11 wherein the magnetic bearing is configured to apply the linear load in a direction oblique to the axial direction of the shaft, thereby urging the spindle at least partially in the axial direction.

17. An apparatus according to claim 11 further comprising a controller configured to selectively adjust at least one of a magnitude of the linear load and the direction of the linear load.

18. An apparatus according to claim 11 wherein the controller is configured to adjust at least one of the rotational load and the linear load cyclically.

19. An apparatus according to claim 11 further comprising a device configured to detect at least one operational parameter of the apparatus.

20. An apparatus according to claim 11 wherein the shaft comprises a decoupling device that at least partially decouples the rotational load device from the spindle such that the linear load is transmitted primarily to the spindle.

21. An apparatus according to claim 11 wherein the rotational load device is a rotational actuator configured to rotate the shaft and the spindle.

22. An apparatus according to claim 11 wherein the rotational load device is configured to transduce rotational motion into electrical energy.

23. A method of testing a spindle for use with a tool, the method comprising:
    rotatably connecting the spindle to a rotational load device via a shaft;

rotating the spindle and the rotational load device; and energizing a linear load device to generate an electromagnetic force and thereby apply a predetermined linear load on the spindle in a predetermined direction, the linear load device having a rotor and a stator, the rotor configured to rotate with the spindle, the stator in communication with the rotor, and the rotor and stator configured to generate an electromagnetic force therebetween that urges the spindle in the predetermined direction.

24. A method according to claim 23 wherein said rotating step comprises energizing the rotational load device and thereby rotating the shaft and the spindle.

25. A method according to claim 23 wherein the energizing step comprises generating an electromagnetic force to apply the linear load on the spindle in a direction transverse to an axial direction of the spindle.

26. A method according to claim 23 wherein the energizing step comprises generating an electromagnetic force in a direction oblique to a radial direction of the spindle, thereby urging the spindle at least partially in an axial direction of the spindle.

27. A method according to claim 23 wherein the energizing step comprises actuating a controller to selectively adjust the linear load.

28. A method according to claim 23 wherein the energizing step comprises applying at least one of the rotational load and the linear load cyclically on the spindle.

29. A method according to claim 23 wherein the energizing step comprises applying at least one of the rotational and linear loads at a frequency corresponding approximately to a rotational frequency of one or more features on the tool occurring at a predetermined rotational operating speed of the spindle.

30. A method according to claim 23 further comprising monitoring at least one operational parameter of the apparatus.

31. A method according to claim 23 wherein said rotating step comprises energizing the spindle and thereby rotating the shaft and the rotational load device, the rotational load device providing a rotationally resistive load.

* * * * *